No. 867,998. PATENTED OCT. 15, 1907.
C. T. NESOM.
SHORT TURNING GEAR FOR VEHICLES.
APPLICATION FILED DEC. 18, 1906.
2 SHEETS—SHEET 1.
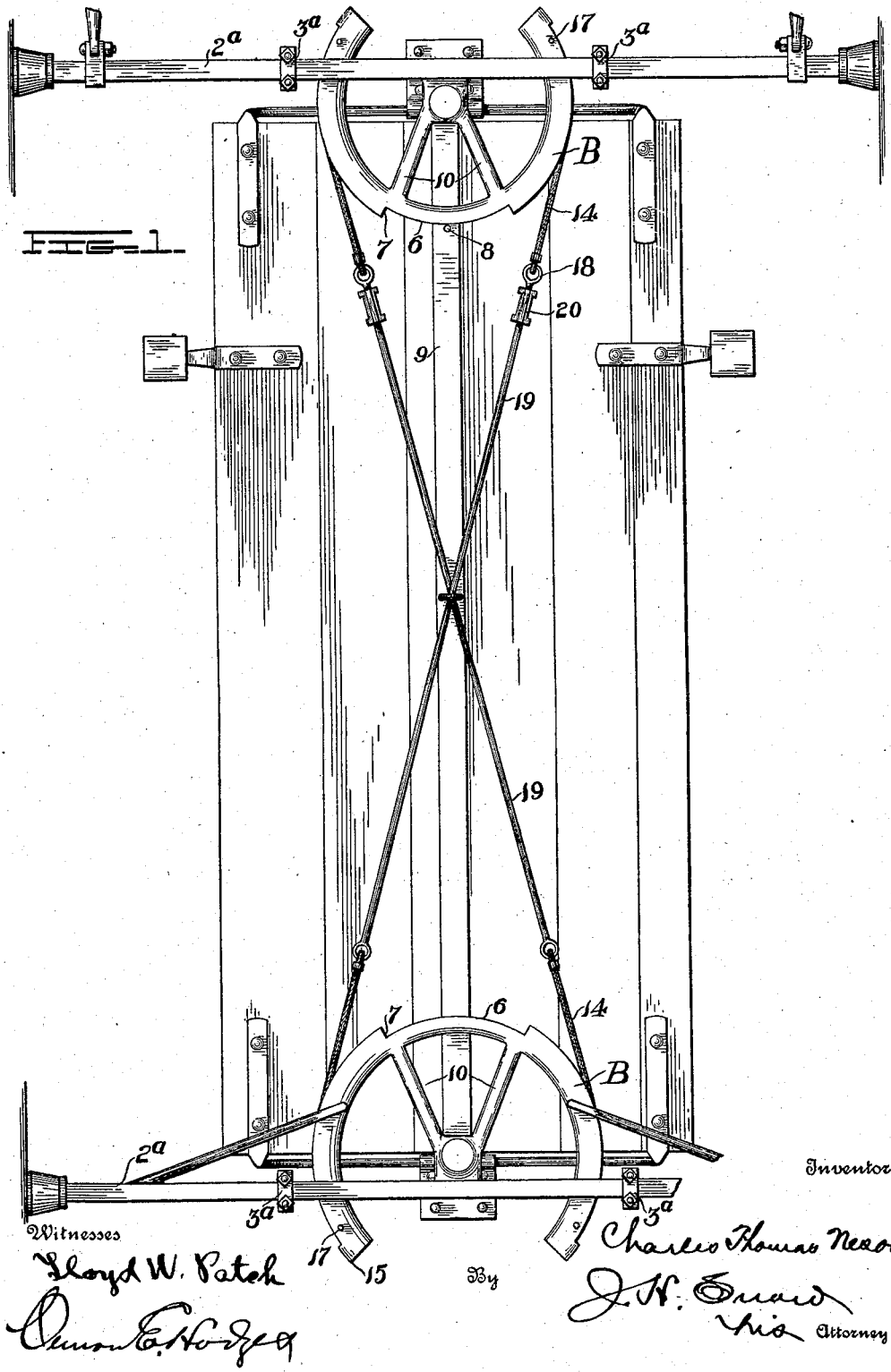

No. 867,998. PATENTED OCT. 15, 1907.
C. T. NESOM.
SHORT TURNING GEAR FOR VEHICLES.
APPLICATION FILED DEC. 18, 1906.
2 SHEETS—SHEET 2.
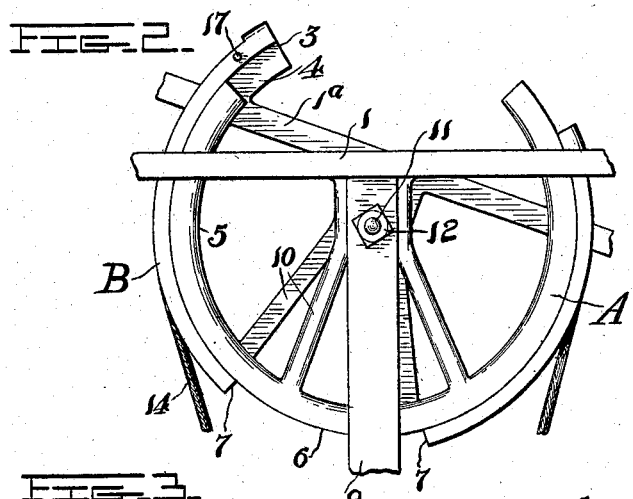
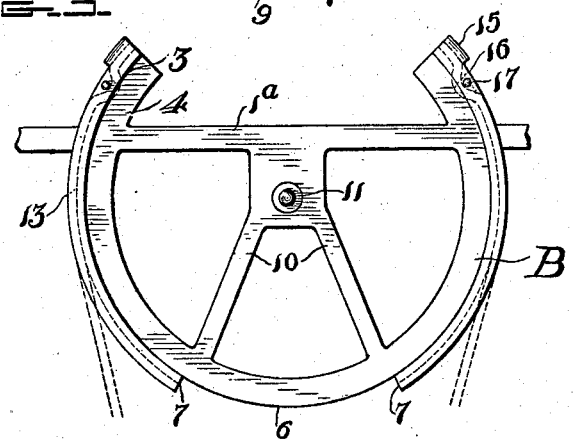
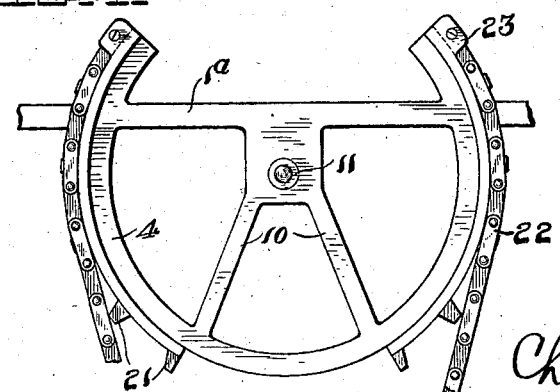
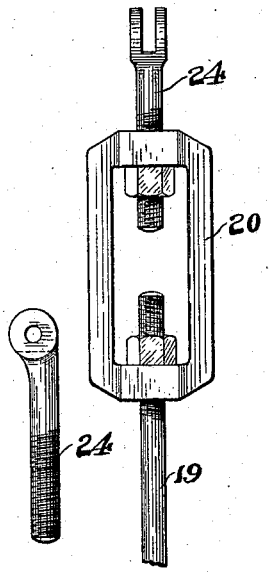
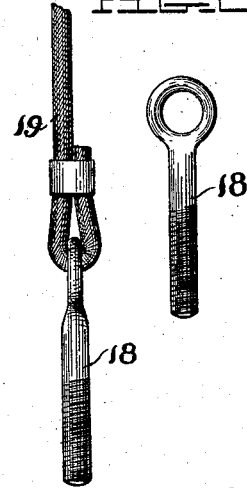
Witnesses
Lloyd W. Patch
Inventor
Charles Thomas Nesom
By J. H. Bruard
his Attorney

UNITED STATES PATENT OFFICE.

CHARLES THOMAS NESOM, OF INDIANAPOLIS, INDIANA.

SHORT TURNING-GEAR FOR VEHICLES.

No. 867,998.

Specification of Letters Patent.

Patented Oct. 15, 1907.

Application filed December 18, 1906. Serial No. 348,468.

*To all whom it may concern:*

Be it known that I, CHARLES T. NESOM, a citizen of the United States, residing at Indianapolis, in the county of Marion and State of Indiana, have invented certain new and useful Improvements in Short Turning-Gear for Vehicles, of which the following is a specification.

My invention relates to an improvement in short turning gear for vehicles, and the object is to provide fifth wheels on both the front and rear axles of the vehicle, and which are so connected together, that by the slightest movement of the front wheels, the same movement will be transmitted to the rear wheels, and by this means a shorter turn can be made.

My invention relates to certain other novel features of construction and combinations of parts which will be hereinafter described and pointed out in the claims.

In the accompanying drawings:—Figure 1 is a bottom plan view of the turning gear applied to a wagon. Fig. 2 is a top plan view of the upper and lower fifth wheels. Fig. 3 is a view of the lower fifth wheel. Fig. 4 is a modified form. Figs. 5 and 6 are details.

A, A, represent the lower fifth wheels, and B, B, the upper fifth wheels, the fifth wheels on the rear axle being slightly larger than those on the front axle. All the fifth wheels are made preferably in the arc of a circle, and from the center spokes 10, 10 extend to the bearing surfaces 4 and 5, and extending upwardly through or from the lower fifth wheel is the usual king bolt 11, which passes through the upper fifth wheel and reach 9 where it is secured by a nut 12. The upper fifth wheels have a transverse bar 1, connecting them at their forward ends by which they are secured to the ordinary springs (not shown) of the vehicle, and the lower fifth wheel has a similar transverse bar 1ª, passing across it, to secure it to axle 2ª, by clamps 3ª.

The lower fifth wheels being constructed alike, it will be necessary to describe only one of them. The diameter of the wheel is greater than the diameter of the bearing surface 5 of the upper wheel, and it is recessed on its upper face at 3, forming a bearing surface 4 for the reception of the bearing surface of the upper wheel to give a lateral bearing as well as a surface bearing. The wheel at its rear is, preferably, cut away as at 6, leaving it the same diameter as the surface of the upper wheel. The edges 7, 7, of this cutaway portion form stops, to limit the distance of the turning of the fifth wheel, which strikes against the pin 8, in the reach 9. The outer bearing surface of the wheel being grooved as at 13, for the reception of a cable 14, which is secured at the front end by means of a wedge 15, and the groove is countersunk at 16 at the forward end so that the cable passes under a bolt or cross-bar 17, before it reaches the wedge 15, thereby making a secure clamp. At the other end of the cable it is connected to a link 18 which is connected to the rod 19 by a coupling 20. The rod and link having right and left threads so that the proper adjustment can be made.

In Fig. 4, I have shown another form of fifth wheel, in which the outer bearing surface is provided with sprockets 21, for the reception of a chain 22, which is secured at the front end of the wheel by a connection 23, and the chain is connected to the rod 19 by a link 24. These rods 19 cross each other about midway of the vehicle, and when the front axle is moved to the right or left, it causes the rear and front wheels on the same side of the vehicle to turn inwardly, whereby the vehicle can be turned around in much less space. Of course, I might do away with the rods 19, and have the cable or chain extend the whole distance, and many other changes might be made in the form and arrangement of the several parts described without departing from the spirit and scope of my invention, and I do not wish to be limited to the exact construction herein set forth, and it will be seen that I have provided a turning gear, which is cheap to manufacture, consisting of few parts, and one which can be applied to any vehicle.

Having fully described my invention, what I claim as new and desire to secure by Letters Patent, is:—

In a short turning gear, the combination with a vehicle, of upper and lower fifth wheels secured thereto, the lower fifth wheel being recessed, and the upper wheel adapted to be received in the recess, said lower fifth wheel being cut away on its outer surface, means engaging the edges of the cut away to limit the movement of the fifth wheel, chains or cables on the outer surface of the lower wheel, and means connecting the chains or cables whereby the fifth wheels are connected together.

In testimony whereof I have signed my name to this specification in the presence of two subscribing witnesses.

CHARLES THOMAS NESOM.

Witnesses:
LOUIS P. WENZ,
THOMAS NESOM.